United States Patent [19]
Radage et al.

[11] Patent Number: 4,869,573
[45] Date of Patent: Sep. 26, 1989

[54] AERIAL OPTICAL CABLE AND ITS METHOD OF MANUFACTURE

[75] Inventors: Paul Radage, Weston Coyney; Peter Harvey, London, both of England

[73] Assignee: BICC Public Limited Company, England

[21] Appl. No.: 181,370

[22] Filed: Apr. 14, 1988

Related U.S. Application Data

[63] Continuation-in-part of Ser. No. 7,666, Jan. 28, 1987, abandoned.

[30] Foreign Application Priority Data

Jan. 29, 1986 [GB] United Kingdom ............... 8602107
Apr. 6, 1988 [GB] United Kingdom ............... 8808039

[51] Int. Cl.⁴ .............................................. G02B 6/44
[52] U.S. Cl. ..................................... 350/96.23; 57/6; 264/1.5
[58] Field of Search ............. 350/96.23; 264/1.5; 57/6

[56] References Cited

U.S. PATENT DOCUMENTS

| | | | |
|---|---|---|---|
| Re. 32,436 | 6/1987 | Hartig | 350/96.23 |
| 4,078,853 | 3/1978 | Kempf et al. | 350/96.23 |
| 4,153,332 | 5/1979 | Longoni | 350/96.23 |
| 4,446,686 | 5/1984 | Panuska et al. | 57/6 |
| 4,457,583 | 7/1984 | Mayr et al. | 350/96.23 |
| 4,534,618 | 8/1985 | Brüggendieck | 350/96.23 |
| 4,629,286 | 12/1986 | Fuse et al. | 350/96.23 |
| 4,632,506 | 12/1986 | Taylor | 350/96.23 |
| 4,671,610 | 6/1987 | Kitayama et al. | 350/96.23 |
| 4,793,685 | 12/1988 | Taylor et al. | 350/96.23 |

FOREIGN PATENT DOCUMENTS

| | | |
|---|---|---|
| 0126509 | 11/1984 | European Pat. Off. . |
| 0137079 | 4/1985 | European Pat. Off. . |
| 3112422 | 10/1982 | Fed. Rep. of Germany . |
| 3412328 | 10/1985 | Fed. Rep. of Germany . |
| 85/00689 | 2/1985 | PCT Int'l Appl. . |
| 1584248 | 2/1981 | United Kingdom . |

*Primary Examiner*—John D. Lee
*Attorney, Agent, or Firm*—Oliff & Berridge

[57] ABSTRACT

An optical cable, especially suitable for use as an aerial cable, comprises a circumferentially rigid flexible tube which is of composite form and comprises a plurality of elongate flexible bodies helically laid up together, each of which bodies is of a cross-section approximating to a sector of an annulus and comprises extruded electrically insulating plastics material and a mulitiplicity of longitudinally stressed elongate flexible non-metallic reinforcing elements encapsulated in said plastics material, e.g. polypropylene or nylon, the multiplicity of non-metallic reinforcing elements being substantially evenly distributed throughout the cross-sectional area of the body. An outer protective non-metallic sheath surrounds the tube and at least one flexible optical guide, e.g. a separate optical fibre, optical bundle or optical fibre ribbon structure, is housed in the bore of and is movable relative to the tube.

19 Claims, 3 Drawing Sheets

AERIAL OPTICAL CABLE AND ITS METHOD OF MANUFACTURE

This is a continuation-in-part application of Ser. No. 007,666 filed Jan. 28, 1987, now abandoned.

This invention relates to optical cables for the transmission of the ultra-violet, visible and infra-red regions of the electromagnetic spectrum, which regions, for convenience, will hereinafter all be included in the generic term "light" and especially, but not exclusively, to optical cables for use in the communications field adapted for transmission of light having a wavelength within the range 0.8 to 2.1 micrometres.

It is an object of the present invention to provide an improved optical cable which is especially, but not exclusively, suitable for use as an aerial optical cable.

According to the invention, the improved optical cable comprises a substantially circumferentially rigid flexible tube which is of composite form and comprises a plurality of elongate flexible bodies helically laid up together, each of which bodies is of a cross-section approximating to a sector of an annulus and comprises extruded electrically insulating plastics material and a multiplicity of longitudinally stressed elongate flexible non-metallic reinforcing elements each substantially encapsulated in said plastics material, the multiplicity of non-metallic reinforcing elements being substantially evenly distributed throughout the cross-sectional area of the body; an outer protective sheath of non-metallic material surrounding the circumferentially rigid tube; and, housed in the bore of and movable relative to the circumferentially rigid tube, at least one flexible optical guide.

Since the or each flexible optical guide is movable relative to the circumferentially rigid tube in which it is housed, limited relative movement between the or each flexible optical guide and the circumferentially rigid tube can take place when the improved optical cable vibrates, oscillates or is otherwise flexed as may, for example, occur when the optical cable, being employed as an aerial cable, is freely suspended from spaced supports in long lengths and is subjected to winds.

The elongate bodies of the circumferentially rigid tube preferably extend helically of the tube with a long length of lay.

Preferably, at any position along the length of the optical cable the proportion of non-metallic reinforcing elements in the composition of each elongate body of the circumferentially rigid tube lies in the range 60 to 70% by volume.

By way of example, the circumferentially rigid tube may have an overall diameter lying in the range 10 to 20mm and an internal diameter lying in the range 5 to 10mm and may comprise eight elongate bodies which extend helically of the tube with a lay length lying in the range 50 to 300mm.

The longitudinally stressed, elongate flexible non-metallic reinforcing elements of each elongate body preferably are made of an aromatic polyamide such as that sold under the trade name "Kevlar"; alternative non-metallic materials of which they may be made include non-optical glass and carbon.

The electrically insulating plastics material in which the non-metallic reinforcing elements are encapsulated preferably is a thermoplastics material, such as polypropylene or nylon but, in some circumstances, it may be a thermosetting plastics material, such as a polyester or epoxy resin or polyurethane.

Other electrically insulating plastics materials in which the non-metallic reinforcing elements may be encapsulated are thermotropic liquid crystalline polymers such as wholly aromatic polyesters, aromatic-aliphatic polyesters, aromatic polyazomethines, aromatic polyester-carbonates and wholly or non-wholly aromatic polyester amides.

In one aspect of the invention, the or each flexible optical guide may comprise a separate optical fibre, an optical bundle as hereinafter defined, or an optical fibre ribbon structure.

By the expression "optical bundle" is meant a group of optical fibres or a group of fibres including one or more optical fibres and one or more non-optical reinforcing fibres or other reinforcing elongate elements.

In another aspect of the invention, the circumferentially rigid tube may tightly surround an optical cable element comprising an assembly of separately formed tubes of plastics material, in at least one of which at least one separate optical fibre, optical bundle, optical fibre ribbon structure or other flexible optical guide is loosely housed. In a preferred embodiment of this aspect of the invention, the optical cable element comprises a plurality of separately formed plastics tubes helically wound around a central flexible elongate member of non-metallic material, e.g. an aromatic polyamide such as that sold under the trade name "Kevlar".

In all cases where the or each flexible optical guide of the improved optical cable is an optical fibre ribbon structure, preferably the optical fibre ribbon structure is of a construction in accordance with U.S. Pat. No. 4630887 of J. E. Taylor and comprises a plurality of optical fibres and at least one flexible elongate reinforcing element of substantially resilient material arranged side by side and embedded in an elongate body of plastics material, wherein the or each resilient reinforcing element is set in such a form that the ribbon structure follows a path of smoothly curved undulations whose axes of curvature lie transverse to the longitudinal axis of the ribbon structure, the arrangement being such that, when the undulating ribbon structure is subjected to a tensile force, the ribbon structure straightens in a lengthwise direction against the action of the undulating resilient reinforcing element or elements thereby reducing the tensile force applied to the optical fibres and, when the tensile force is removed, the ribbon structure returns towards its original undulating form.

The outer protective sheath of the improved optical cable may be of any suitable plastics material, polyethylene being preferred.

The composite substantially circumferentially rigid flexible tube of the improved optical cable preferably is made by a method of manufacture which comprises the steps of drawing a multiplicity of elongate flexible non-metallic reinforcing elements under tension in the directions of their lengths through electrically insulating plastics material which is in a liquid or semi-liquid state; causing the multiplicity of non-metallic reinforcing elements encapsulated in electrically insulating plastics material in a liquid or semi-liquid state to pass through an elongate die having an outlet orifice having a transverse cross-section approximating to a sector of an annulus to form an elongate flexible body which has a transverse cross-section approximating to a sector of an annulus and in which the multiplicity of non-metallic reinforcing elements are substantially evenly distributed throughout the cross-sectional area of the body, which die, between its ends, is of such a shape that non-metallic reinforcing elements constituting and adjacent to the outer arcuate surface of the elongate flexible body so formed are travelling at a greater linear speed than non-metallic reinforcing elements remote therefrom; causing the elongate flexible body as it emerges from the die to follow a helical path within an imaginary cylinder of substantially circular cross-section in such a way that the convex outer arcuate surface of the body is maintained outermost and so treating the helically advancing body that the plastics material in which the reinforcing elements are encapsulated sets; laying up the helically advancing elongate flexible body with a plurality of helically advancing elongate flexible bodies of similar transverse cross-section and construction to form a twisting substantially circumferentially rigid flexible tube of approximately circular transverse cross-section which is rotating about its longitudinal axis and feeding at least one flexible optical guide into the bore of the tube as it is being formed; and taking up the flexible tube in such a way that any residual tension in the tube arising from said rotation is removed.

Preferably, the elongate flexible bodies are manufactured concurrently and are assembled together at a single assembly station but, in some circumstances, a single elongate flexible body may be assembled with another elongate flexible body or a sub-assembly of at least two elongate flexible bodies at each of a plurality of longitudinally spaced assembly stations.

The elongate flexible bodies may be assembled together by feeding the bodies helically around a substantially rigid tubular mandrel of substantially circular cross-section which has an external diameter substantially equal to the internal diameter of the circumferentially rigid tube being formed and into the trailing end of the bore of which said at least one flexible optical guide is drawn.

Downstream of the rigid tubular mandrel at least one tape of electrically insulating material or other flexible binder may be helically lapped around the assembly of elongate flexible bodies, the direction of lay of the helically wound tape being opposite to that of the helically assembled elongate flexible bodies.

Between its ends, the elongate die preferably follows a smoothly curved arcuate path, the internal surface of the die defining the outer arcuate surface of the flexible elongate body having the greater radius of curvature. By virtue of the fact that the elongate die between its ends follows a smoothly curved path, the non-metallic reinforcing elements immediately adjacent that part of the inner surface of the die having the greater radius of curvature will travel under tension at a linear speed greater than that of the non-metallic reinforcing elements remote therefrom. Preferably, over at least a major part of the length of the smoothly curved elongate die, the internal surface of the die defining the outer arcuate surface of the flexible elongate body and the internal surface of the die defining the inner arcuate surface of the flexible elongate body are so curved that the transverse cross-section of the smoothly curved elongate die is substantially constant in shape and size to ensure that the non-metallic reinforcing elements are drawn under tension through the die at the desired linear speeds relative to one another.

At its entry end, the elongate die preferably opens into and forms part of an open topped chamber into which the electrically insulating plastics material in a liquid or semi-liquid state is fed, preferably through an inlet port intermediate of the ends of the die. The multiplicity of flexible non-metallic reinforcing elements preferably are drawn under tension approximately vertically downwardly into the open topped chamber of electrically insulating plastics material in a liquid or semi-liquid state.

In order to cause the elongate flexible body as it emerges from the die to follow said helical path, preferably immediately downstream of the smoothly curved die the elongate flexible body passes into a helically extending groove in the outer surface of a substantially rigid elongate member and, as the elongate flexible body travels along the helically extending groove, the body is so treated that the electrically insulating plastics material in which the elongate flexible non-metallic reinforcing elements are encapsulated sets. Preferably, the helically grooved rigid elongate member is enclosed within a tightly fitting tube of substantially circular cross-section in order to provide an outer boundary surface of arcuate shape for the helical groove.

Means drawing the elongate flexible body through the smoothly curved die and helically grooved elongate member and means drawing the elongate flexible bodies as they are assembled together may take any convenient form and may be located at any convenient position along the line. Having regard to the relatively slow speed at which the elongate flexible body is formed, the drawing means may take the form of longitudinally spaced reciprocating clamps which intermittently draw a predetermined length of body from the smoothly curved die; alternatively, the drawing means may be a pair of driven endless belts which are rotatably driven bodily around the axis of the twisting body.

The take up means by which any residual torsion is removed from the rotating flexible tube may be a drum twister or it may take the form of a rotatably driven turntable on to which the rotating flexible tube is so coiled that any residual torsion is removed.

Since the elongate flexible tube is rotating about its axis as it is being formed, the source from which at least one flexible optical guide is fed into the bore of the tube must itself be rotatably driven bodily about the axis of the tube in synchronism with the rotating tube.

Where the plastics material in which the non-metallic reinforcing elements are encapsulated is a thermoplastics material, the plastics material will be introduced into the chamber at such a temperature that the material is in a liquid or semi-liquid state and the chamber and/or elongate die will be heated to maintain the material at that temperature. Cooling air will be directed on to the helically grooved elongate member in order to cause the plastics material to set.

Where the plastics material is a thermosetting material, the helically grooved elongate member will be heated in order to cause the plastics material to set.

The invention is further illustrated by a description, by way of example, of three preferred forms of the improved optical cable and of the preferred method of manufacturing the improved optical cable with reference to the accompanying drawings, in which.

Figure 3:
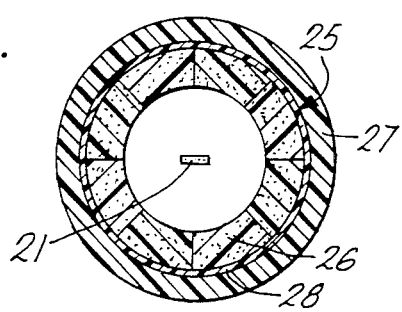
FIG. 3 is a transverse cross-sectional view, drawn on an enlarged scale, of a third preferred form of optical cable.
Figure 4:
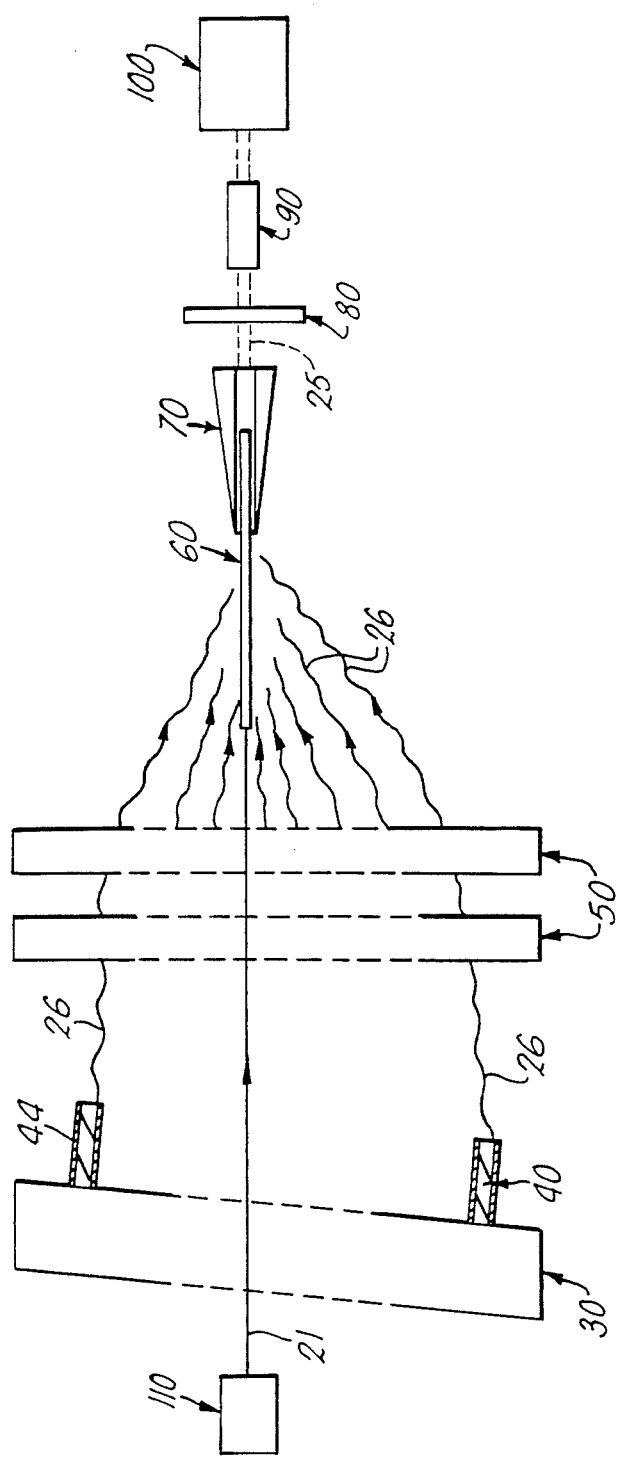
Figure 5:
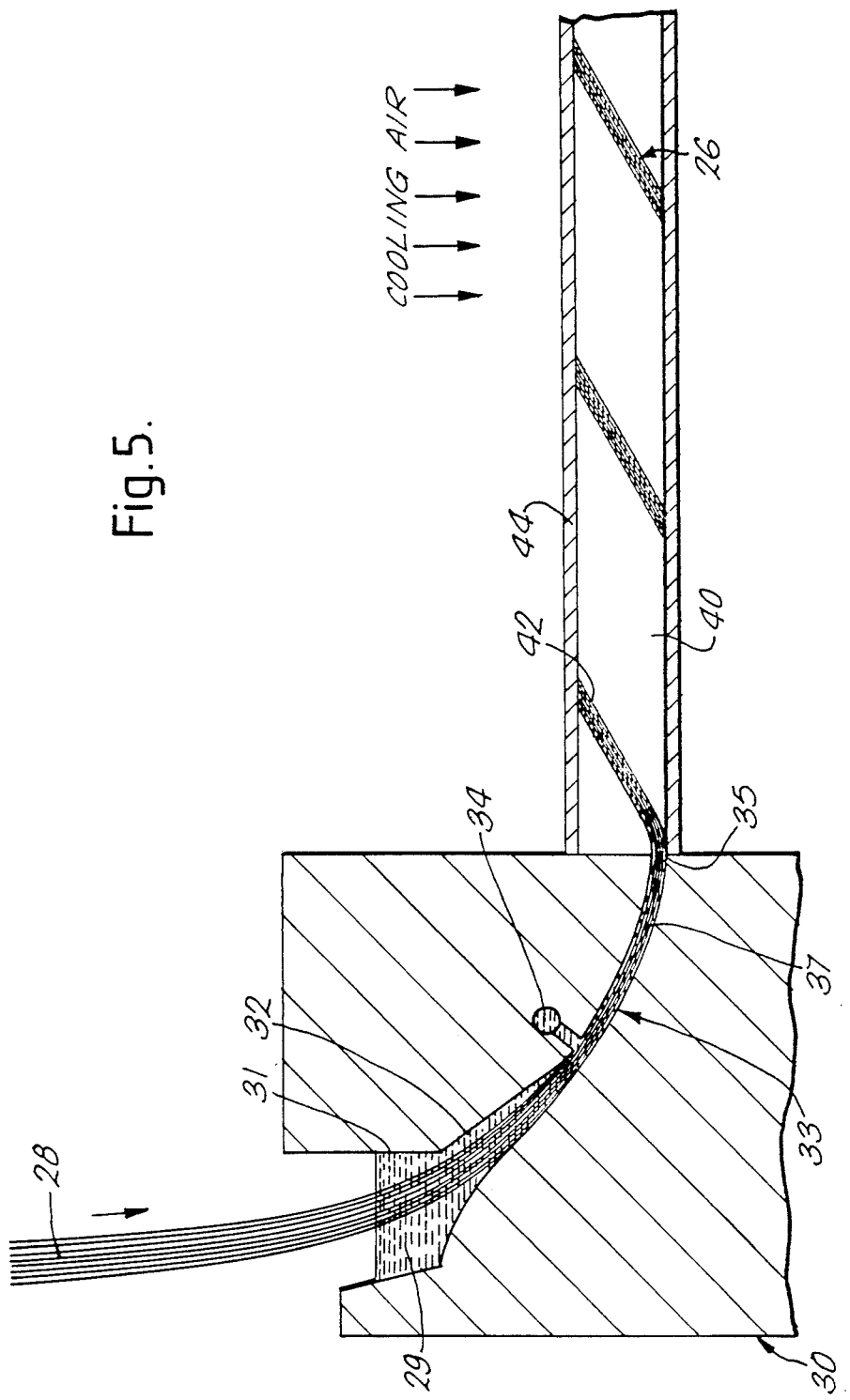

FIG. 4 is a schematic representation of the apparatus employed in the manufacture of the substantially circumferentially rigid flexible tube of the optical cable shown in FIG. 3, and FIG. 5 is a diagrammatic side view, partly in section and partly in elevation, of one preferred elongate die and helically grooved rigid elongate member for forming an elongate flexible body having a transverse cross-section approximating to a sector of an annulus.

Figure 1:
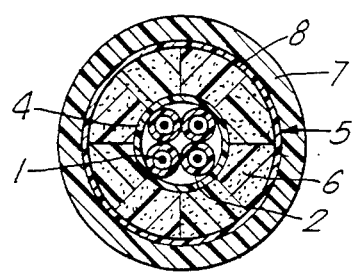
FIG. 1 is a transverse cross-sectional view, drawn on an enlarged scale, of a first preferred form of optical cable.

The first preferred form of optical cable shown in FIG. 1 comprises four plastics tube 2, in each of which a separate optical fibre 1 is loosely housed and which are helically laid-up together to form an optical cable element around which is helically wound a plastics tape 4. The taped optical cable element is surrounded by a substantially circumferentially rigid flexible tube 5 which has an overall diameter of 15 mm and an internal diameter of 7.5 mm and which is of a composite form comprising eight elongate flexible bodies 6, each of a cross-section approximating to a sector of an annulus, helically laid up together with a lay length of 200 mm. Each elongate body 6 comprises extruded electrically insulating thermoplastics material and a multiplicity of longitudinally stressed elongate flexible reinforcing elements of an aromatic polyamide each substantially encapsulated in said thermoplastics material, the multiplicity of reinforcing elements being substantially evenly distributed throughout the cross-sectional area of the body and the proportion of reinforcing elements in the composition lying in the range 60 to 70% by volume. A layer 8 of helically lapped plastics tape overlies the circumferentially rigid flexible tube 5 and is surrounded by a protective sheath 7 of plastics material. It will be appreciated that since each of the optical fibres 1 is loosely housed in a plastics tube 2 of the optical cable element, each optical fibre is movable relative to the circumferentially rigid tube 5.

Figure 2:
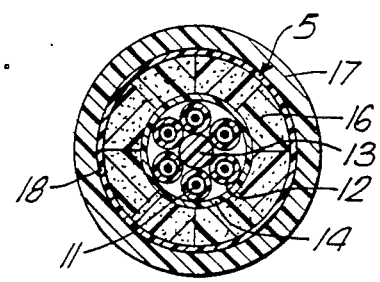
FIG. 2 is a transverse cross-sectional view, drawn on an enlarged scale, of a second preferred form of optical cable.

In the second preferred form of optical cable shown in FIG. 2, the optical cable element comprises a central flexible elongate reinforcing member 13 of a resin bonded aromatic polyamide around which are helically laid six plastics tubes 12 in each of which a separate optical fibre 11 is loosely housed. The optical cable element has a plastics tape 14 helically lapped around the assembly of tubes to hold them together. A substantially circumferentially rigid flexible tube 15 of the same construction as that of the tube 5 of the optical cable shown in FIG. 1 surrounds the taped optical cable element and a layer 18 of helically lapped plastics tape overlies the tube and is surrounded by a protective sheath 17 of plastics material.

The third preferred form of optical cable shown in FIG. 3 comprises a substantially circumferentially rigid flexible tube 25 of composite form which comprises eight elongate flexible bodies 26, each of a cross-section approximating to a sector of an annulus, helically laid-up together. Each of the elongate bodies 36 is of the same composition as that of the elongate bodies 6 of the tube 5 of the optical cable shown in FIG. 1. An optical fibre ribbon structure 21 is loosely housed in the bore of the circumferentially rigid tube 25 and a layer 28 of helically lapped plastics tape overlies the tube and is surrounded by a protective sheath 27 of plastics material.

In the optical cable shown in FIG. 3, the optical fibre ribbon structure may comprise a plurality of optical fibres and at least one flexible elongate reinforcing element of substantially resilient material arranged side-by-side and embedded in an elongate body of plastics material, the or each resilient reinforcing element being set in such a form that the ribbon structure follows a path of smoothly curved undulations whose axes of curvature lie transverse to the longitudinal axis of the ribbon structure, the arrangement being such that, when the undulating ribbon structure is subjected to a tensile force, the ribbon structure straightens in a lengthwise direction against the action of the undulating resilient reinforcing element or elements thereby reducing the tensile force applied to the optical fibres and, when the tensile force is removed, the ribbon structure returns towards its original undulating form.

Referring to FIGS. 4 and 5, the apparatus employed in the manufacture of the circumferentially rigid flexible tube 25 of the optical cable shown in FIG. 3 comprises eight chambers and associated dies generally referred to at 30 and eight helically grooved rigid rods 40, one of which is associated with each die. Downstream of the eight chambers, dies and helically grooved rods are two reciprocating haul-off devices 50 by means of which elongate flexible bodies each having a transverse cross-section approximating to a sector of an annulus are incrementally drawn from the dies and helically grooved rods. Downstream of the reciprocating haul-off devices 50 is a rigid tubular mandrel 60, a die 70, a taping head 80, a haul-off device 90 and a turntable 100. A source 110 of optical fibre ribbon 21 is provided for feeding optical fibre ribbon into the upstream end of the tubular mandrel 60.

As will be seen on referring to FIG. 5, each of the eight chambers and dies 30 comprises an open topped chamber 31 which, at the bottom of the chamber, blends by means of a passage 32 of approximately triangular shape into a smoothly curved elongate die 33 which, between its ends, follows a smoothly curved arcuate path and has a substantially constant transverse cross-section approximating to a sector of an annulus. Intermediate of the ends of the die 33 is an inlet port 34 by means of which electrically insulating plastics material 29 in a semi-liquid state can be fed to the die and hence the open topped chamber 31. At its downstream outlet end 35, the elongate die 33 opens into one end of a helically extending groove 42 in the outer surface of a rigid rod 40 which extends substantially horizontally from the body of the chamber 31. A rigid tube 44 fits tightly around the helically grooved rod 40. The groove 42 has a transverse cross-section bounded by the radially extending side walls and smaller arcuate side wall of a sector of an annulus, and by the internal surface of the tube 44. The internal surface 37 of the die 33 defining the outer arcuate surface of the flexible elongate body has the greater radius of curvature.

In use, a multiplicity of flexible reinforcing elements 28 of aromatic polyamide are drawn under tension in the direction of their lengths downwardly through electrically insulating thermoplastics material 29 which is continuously fed into the open topped chamber 31 through the inlet port 34 and which is at such a temperature that the thermoplastics material is in a semi-liquid state. The multiplicity of reinforcing elements 28 encapsulated in electrically insulating plastics material in a semi-liquid state pass through the elongate die 33 to form an elongate flexible body 26 which has a transverse cross-section approximating to a sector of an annulus and in which the multiplicity of reinforcing elements are substantially evenly distributed throughout the cross-sectional area of the body. Immediately downstream of the smoothly curved die 33, the elongate flexible body 26 passes into the helically extending groove 42 in the outer surface of the rigid rod 40 and, as the elongate flexible body travels along the helically extending groove, cooling air is directed from a source (not shown) on to the rigid tube 44 to cause the electrically insulating plastics material 29 of the advancing body to set. The die 33 is of such a shape that reinforcing elements 28 constituting and adjacent to the outer arcuate surface of the elongate flexible body 26 are travelling at a greater linear speed than reinforcing elements remote therefrom. Furthermore, by causing the elongate flexible body to travel along the helical groove 42 in the outer surface of the rigid rod 40, the elongate flexible body follows a helical path within an imaginary cylinder of circular cross-section in such a way that the convex outer arcuate surface of the body is maintained outermost.

The eight flexible bodies 26 being manufactured concurrently and being withdrawn in increments from the rigid rods 40 by the reciprocating haul-off devices 50, are helically laid around the rigid tubular mandrel 60 and pass through the die 70 to form the circumferentially rigid flexible tube 25 which is rotating about its longitudinal axis. Immediately downstream of the die 70, a plastics tape is helically wound around the flexible tube 25, the direction of lay of the tape being opposite to that of the flexible bodies 26. At the same time, an optical fibre ribbon 21 from the source 110, which is being rotatably driven bodily about the axis of the tube 25 in synchronism with the rotating tube, is fed into the upstream end of the tubular mandrel 60. The circumferentially rigid flexible tube 25 with the optical fibre ribbon 21 loosely housed therein is drawn through the die 70 by the haul-off device 90 and is coiled on a rotatably driven turntable 100 in such a way that any residual torsion is removed from the tube. Subsequently, in a separate operation, an outer protective sheath 27 of electrically insulating plastics material is extruded over the circumferentially rigid flexible tube 25.

What we claim is:

1. An optical cable comprising a substantially circumferentially rigid flexible tube which is of composite form and comprises a plurality of elongate flexible bodies helically laid-up together, each of which bodies is of a cross-section approximating to a sector of an annulus and comprises extruded electrically insulating plastics material and a multiplicity of longitudinally stressed elongate flexible non-metallic reinforcing elements each substantially encapsulated in said plastics material, the multiplicity of non-metallic reinforcing elements being substantially evenly distributed throughout the cross-sectional area of the body; an outer protective sheath of non-metallic material surrounding the circumferentially rigid tube; and, housed in the bore of and movable relative to the circumferentially rigid tube, at least one flexible optical guide.

2. An optical cable as claimed in claim 1, wherein at any position along the length of the optical cable the proportion of non-metallic reinforcing elements in the composition of each elongate body of the circumferentially rigid tube lies in the range 60 to 70% by volume.

3. An optical cable as claimed in claim 1, wherein the elongate bodies of the circumferentially rigid tube extend helically of the tube with a long length of lay.

4. An optical cable as claimed in claim 1, wherein the circumferentially rigid tube has an overall diameter lying in the range 10 to 20 mm and an internal diameter lying in the range 5 to 10 mm and comprises eight elongate bodies which extend helically of the tube with a lay length lying in the range 50 to 300 mm.

5. An optical cable as claimed in claim 1, wherein the longitudinally stressed, elongate flexible non-metallic reinforcing elements are made of an aromatic polyamide.

6. An optical cable as claimed in claim 1, wherein the plastics material in which the non-metallic reinforcing elements are encapsulated is a thermoplastics material.

7. An optical cable as claimed in claim 1, wherein the plastics material in which the non-metallic reinforcing elements are encapsulated is a thermosetting plastics material.

8. An optical cable as claimed in claim 1, wherein the plastics material in which the non-metallic reinforcing elements are encapsulated is a thermotropic liquid crystalline polymer.

9. An optical cable as claimed in claim 1, wherein the or each flexible optical guide is a separate optical fibre.

10. An optical cable as claimed in claim 1, wherein the or each flexible optical guide is an optical bundle.

11. An optical cable as claimed in claim 1, wherein the or each flexible optical guide is an optical fibre ribbon structure.

12. An optical cable as claimed in claim 11, wherein the or each optical fibre ribbon structure comprises a plurality of optical fibres and at least one flexible elongate reinforcing element of substantially resilient material arranged side-by-side and embedded in an elongate body of plastics material, the or each resilient reinforcing element being set in such a form that the ribbon structure follows a path of smoothly curved undulations whose axes of curvature lie transverse to the longitudinal axis of the ribbon structure, the arrangement being such that, when the undulating ribbon structure is subjected to a tensile force, the ribbon structure straightens in a lengthwise direction against the action of the undulating resilient reinforcing element or elements thereby reducing the tensile force applied to the optical fibres and, when the tensile force is removed, the ribbon structure returns towards its original undulating form.

13. An optical cable as claimed in claim 1, wherein the circumferentially rigid tube tightly surrounds an optical cable element comprising an assembly of separately formed tubes of plastics material, in at least one of which at least one flexible optical guide is loosely housed.

14. An optical cable as claimed in claim 13, wherein the optical cable element comprises a plurality of separately formed plastics tubes helically wound around a central flexible elongate member of non-metallic material.

15. An optical cable as claimed in claim 1, wherein the outer protective sheath is of plastics material.

16. A method of manufacturing an optical cable which comprises the steps of:
(a) drawing a multiplicity of elongate flexible non-metallic reinforcing elements under tension in the directions of their lengths through electrically insulating plastics material which is in a liquid or semi-liquid state; causing the multiplicity of non-metallic reinforcing elements encapsulated in electrically insulating plastics material in a liquid or semi-liquid state to pass through an elongate die having an outlet orifice having a transverse cross-section approximating to a sector of an annulus to form an elongate flexible body which has a transverse cross-section approximating to a sector of an annulus and in which the multiplicity of non-metallic reinforcing elements are substantially evenly distributed throughout the cross-sectional area of the body, which die, between its ends, is of such a shape that non-metallic reinforcing elements constituting and adjacent to the outer arcuate surface of the elongate flexible body so formed are travelling at a greater linear speed than non-metallic reinforcing elements remote therefrom;

(b) causing the elongate flexible body as it emerges from the die to follow a helical path within an imaginary cylinder of substantially circular cross-section in such a way that the convex outer arcuate surface of the body is maintained outermost and so treating the helically advancing body that the plastics material in which the reinforcing elements are encapsulated sets;

(c) laying up the helically advancing elongate flexible body with a plurality of helically advancing elongate flexible bodies of similar transverse cross-section and construction to form a helically advancing elongate flexible tube of approximately circular transverse cross-section which is rotating about its longitudinal axis and feeding at least one flexible optical guide into the bore of the tube as it is being formed;

(d) taking up the flexible tube in such a way that any residual torsion in the tube arising from said rotation is removed;

(e) and, in a separate operation, extruding over the tube an outer protective sheath of electrically insulating plastics material.

17. A method as claimed in claim 16, wherein the elongate die follows a smoothly curved arcuate path, the internal surface of the die defining the outer arcuate surface of the flexible elongate body having the greater radius of curvature.

18. A method as claimed in claim 17, wherein, over at least a major part of the length of the smoothly curved elongate die, the internal surface of the die defining the outer arcuate surface of the flexible elongate body and the internal surface of the die defining the inner arcuate surface of the flexible elongate body are so curved that the transverse cross-section of the smoothly curved elongate die is substantially constant in shape and size to ensure that the non-metallic reinforcing elements are drawn under tension through the die at the desired linear speeds relative to one another.

19. A method as claimed in claim 16, wherein, immediately downstream of the smoothly curved die, the elongate flexible body passes into a helically extending groove in the outer surface of a substantially rigid elongate member enclosed within a tightly fitting tube of substantially circular cross-section and, as the elongate flexible body travels along the helically extending groove, the electrically insulating plastics material in which the elongate flexible non-metallic reinforcing elements are encapsulated is so treated that it is caused to set.

* * * * *